(12) United States Patent
Lee et al.

(10) Patent No.: US 11,274,944 B2
(45) Date of Patent: Mar. 15, 2022

(54) APPARATUS FOR SENSING ROTATING BODY

(71) Applicant: Samsung Electro-Mechanics Co., Ltd., Suwon-si (KR)

(72) Inventors: Jong Woo Lee, Suwon-si (KR); Joo Yul Ko, Suwon-si (KR); Kyung O Kim, Suwon-si (KR); Ho Kwon Yoon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 896 days.

(21) Appl. No.: 16/053,060

(22) Filed: Aug. 2, 2018

(65) Prior Publication Data

US 2019/0094048 A1   Mar. 28, 2019

(30) Foreign Application Priority Data

Sep. 28, 2017   (KR) .................. KR10-2017-0126178
Nov. 17, 2017   (KR) .................. KR10-2017-0154182
May 31, 2018   (KR) .................. KR10-2018-0062965

(51) Int. Cl.
*G01D 5/245* (2006.01)
*G01D 5/243* (2006.01)
*G01D 5/20* (2006.01)

(52) U.S. Cl.
CPC .......... *G01D 5/245* (2013.01); *G01D 5/2006* (2013.01); *G01D 5/243* (2013.01)

(58) Field of Classification Search
CPC .......... G01D 5/12; G01D 5/20; G01D 5/2006; G01D 5/243–2497
See application file for complete search history.

(56) References Cited

U.S. PATENT DOCUMENTS

2005/0177338 A1* 8/2005 Takeuchi ............. G01D 5/2457
                                                                702/163
2009/0167296 A1* 7/2009 Yokokawa ................ G01P 3/00
                                                                324/207.25

(Continued)

FOREIGN PATENT DOCUMENTS

EP    3 193 142 A2   7/2017
JP    H1-140018 A    6/1989

(Continued)

OTHER PUBLICATIONS

Korean Office Action dated Apr. 16, 2019 in counterpart Korean Patent Application No. 10-2018-0062965 (7 pages in English and 5 pages in Korean).

(Continued)

*Primary Examiner* — Huy Q Phan
*Assistant Examiner* — David B Frederiksen
(74) *Attorney, Agent, or Firm* — NSIP Law

(57) ABSTRACT

An apparatus for sensing a rotating body includes a plurality of units to be detected provided on the rotating body; at least two sensing coils disposed to face the units to be detected; an oscillator including at least two capacitors respectively connected to the at least two sensing coils to form at least two oscillation circuits; and a rotation information calculator configured to count frequencies of at least two oscillation signals respectively output from the at least two oscillation circuits to generate a first count value and a second count value, and calculate a rotation direction of the rotating body based on a change in the first count value and a change in the second count value.

24 Claims, 11 Drawing Sheets

(56) References Cited

U.S. PATENT DOCUMENTS

| | | | |
|---|---|---|---|
| 2009/0190283 A1* | 7/2009 | Hammerschmidt | H03L 7/0805 361/240 |
| 2016/0054351 A1* | 2/2016 | Dunbar | G01D 5/2451 324/207.25 |
| 2016/0091342 A1* | 3/2016 | Liu | G01D 5/20 324/207.25 |
| 2018/0172480 A1* | 6/2018 | Courtel | G01D 5/24461 |
| 2018/0313665 A1 | 11/2018 | Goto et al. | |

FOREIGN PATENT DOCUMENTS

| | | | |
|---|---|---|---|
| JP | 7-128006 A | | 5/1995 |
| JP | 07128006 | * | 5/1995 |
| JP | 2008-203199 A | | 9/2008 |
| JP | 2009-128312 A | | 6/2009 |
| JP | 2011-80793 A | | 4/2011 |
| JP | 2011-185732 A | | 9/2011 |
| JP | 2011185732 A | * | 9/2011 |
| JP | 2014-92418 A | | 5/2014 |
| JP | 2015-224922 A | | 12/2015 |
| JP | 2017-116429 A | | 6/2017 |
| JP | 2017116429 A | * | 6/2017 |
| JP | 2017-150861 A | | 8/2017 |
| WO | WO 2017/078110 A1 | | 5/2017 |

OTHER PUBLICATIONS

Japanese Office Action dated Jun. 4, 2019 in counterpart Japanese Patent Application No. 2018-141722 (8 pages in English and 4 pages in Japanese).

* cited by examiner

APPARATUS FOR SENSING ROTATING BODY

CROSS-REFERENCE TO RELATED APPLICATIONS

This application claims the benefit under 35 USC 119(a) of Korean Patent Application Nos. 10-2017-0126178 filed on Sep. 28, 2017, 10-2017-0154182 filed on Nov. 17, 2017, and 10-2018-0062965 filed on May 31, 2018, in the Korean Intellectual Property Office, the entire disclosures of which are incorporated herein by reference for all purposes.

BACKGROUND

1. Field

This application relates to an apparatus for sensing a rotating body.

2. Description of Related Art

A rotating body has been used in various devices such as a motor and a wheel switch of a wearable device. There has been a trend to make such devices smaller and thinner. Also, such devices have included a sensing circuit for sensing a position of the rotating body and a fine displacement of the rotating body.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for sensing a rotating body includes a plurality of units to be detected provided on the rotating body; at least two sensing coils facing the units to be detected; an oscillator including at least two capacitors respectively connected to the at least two sensing coils to form at least two oscillation circuits; and a rotation information calculator configured to count frequencies of at least two oscillation signals respectively output from the at least two oscillation circuits to generate a first count value and a second count value, and calculate a rotation direction of the rotating body based on a change in the first count value and a change in the second count value.

The rotation information calculator may be further configured to generate a first count increase value in response to an increase in the first count value, generate a first count decrease value in response to a decrease in the first count value, generate a second count increase value in response to an increase in the second count value, and generate a second count decrease value in response to a decrease in the second count value.

The rotation information calculator may be further configured to calculate the rotation direction of the rotating body based on the first count increase value, the first count decrease value, the second count increase value, the second count decrease value, and a dispositional relationship between the at least two sensing coils.

The rotation information calculator may be further configured to calculate either one or both of a rotation angle of the rotating body and an angular velocity of the rotating body based on an output signal generated by comparing a difference value between the first count value and the second count value with a plurality of comparison values.

The plurality of comparison values may be between a maximum value and a minimum value of the difference value.

A difference between two adjacent comparison values of the plurality of comparison values may be equal to twice a difference between a comparison value, adjacent to the maximum value, among the plurality of comparison values and the maximum value, or twice a difference between a comparison value, adjacent to the minimum value, among the plurality of comparison values and the minimum value.

The rotation information calculator may be further configured to calculate the rotation angle of the rotating body from high level periods and low level periods of the output signal.

The rotation information calculator may be further configured to calculate the angular velocity of the rotating body based on a frequency of the output signal.

The rotation information calculator may be further configured to calculate an angular velocity of the rotating body based on a maximum value and a minimum value of a difference value between the first count value and the second count value.

A size of each of the at least two sensing coils and an interval between centers of the at least two sensing coils may be equal to a multiple of a target sensing angle for sensing rotation of the rotating body.

A size of each of the plurality of units to be detected and an interval between the plurality of units to be detected may be equal to a product of a number of the at least two sensing coils and a size of each of the at least two sensing coils.

In another general aspect, an apparatus for sensing a rotating body includes a first unit to be detected connected to the rotating body and including a plurality of patterns having a first phase; a second unit to be detected connected to the rotating body and including a plurality of patterns having a second phase different from the first phase; a first sensing coil facing the first unit to be detected; a second sensing coil facing the second unit to be detected; an oscillator including a first capacitor connected to the first sensing coil to form a first oscillation circuit; and a second capacitor connected to the second sensing coil to form a second oscillation circuit; and a rotation information calculator configured to count a frequency of a first oscillation signal output from the first oscillation circuit to generate a first count value, count a frequency of a second oscillation signal output from the second oscillation circuit to generate a second count value, and calculate a rotation direction of the rotating body based on a change in the first count value and a change in the second count value.

Regions of the plurality of patterns of the first unit to be detected and regions of the plurality of patterns of the second unit to be detected may partially overlap each other in an axial direction of the rotating body.

Sizes of the regions may be equal to sizes of the first sensing coil and the second sensing coil.

The sizes of the first sensing coil and the second sensing coil may be equal to a target sensing angle for sensing rotation of the rotating body.

A size of one of the plurality of patterns of the first unit to be detected may be equal to twice the size of the first sensing coil, and a size of one of the plurality of patterns of the second unit to be detected may be equal to twice the size of the second sensing coil.

In another general aspect, an apparatus for sensing a rotating body includes a plurality of units to be detected provided on the rotating body; at least two oscillation circuits coupled to the units to be detected and configured to respectively output at least two oscillation signals having respective frequencies that change as the rotating body rotates; and a processor configured to count the frequencies of at the least two oscillation signals to generate a first count value and a second count value, and calculate a rotation direction of the rotating body based on a change in the first count value and a change in the second count value.

The apparatus may further include a memory configured to store instructions executable by the processor, and the processor may be further configured to execute the instructions to configure the processor to count the frequencies of at the least two oscillation signals to generate the first count value and the second count value, and calculate the rotation direction of the rotating body based on the change in the first count value and the change in the second count value.

Each of the at least two oscillation circuits may be sequentially coupled to each of the units to be detected as the rotating body rotates.

The processor may be further configured to calculate a difference value equal to a difference between the first count value and a second count value, compare the difference value with a plurality of comparison values, generate an output signal having high level periods alternating with low level periods based on a result of the comparing, and calculate either one or both of a rotation angle of the rotating body and an angular velocity of the rotating body based on the output signal.

In another general aspect, an apparatus for sensing a rotating body includes a first unit to be detected connected to the rotating body and including a plurality of patterns having a first phase; a second unit to be detected connected to the rotating body and including a plurality of patterns having a second phase different from the first phase; two oscillation circuits coupled to the units to be detected and configured to respectively output two oscillation signals having respective frequencies that change as the rotating body rotates; and a processor configured to count the frequencies of the two oscillation signals to generate a first count value and a second count value, and calculate a rotation direction of the rotating body based on a change in the first count value and a change in the second count value.

The apparatus may further include a memory configured to store instructions executable by the processor, and the processor may be further configured to execute the instructions to configure the processor to count the frequencies of the two oscillation signals to generate the first count value and the second count value, and calculate the rotation direction of the rotating body based on the change in the first count value and the change in the second count value.

The two oscillation circuits may include a first oscillation circuit sequentially coupled to each of patterns of the first unit to be detected as the rotating body rotates and not coupled to any of the patterns of the second unit to be detected; and a second oscillation circuit sequentially coupled to each of patterns of the second unit to be detected as the rotating body rotates and not coupled to any of the patterns of the first unit to be detected.

The processor may be further configured to calculate a difference value equal to a difference between the first count value and a second count value, compare the difference value with a plurality of comparison values, generate an output signal having high level periods alternating with low level periods based on a result of the comparing, and calculate either one or both of a rotation angle of the rotating body and an angular velocity of the rotating body based on the output signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
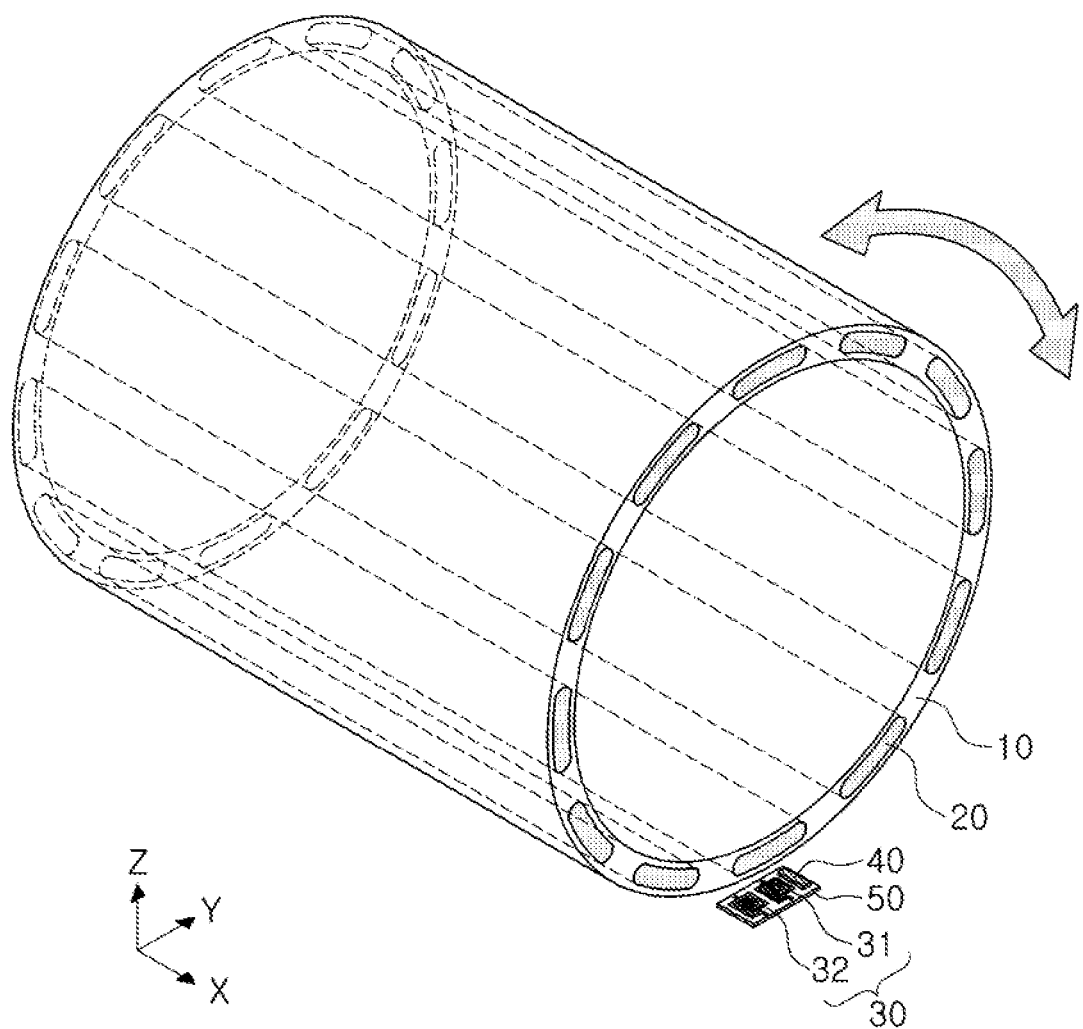
FIG. 1A is a view illustrating an example of an apparatus for sensing a rotating body.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Figure 1B:
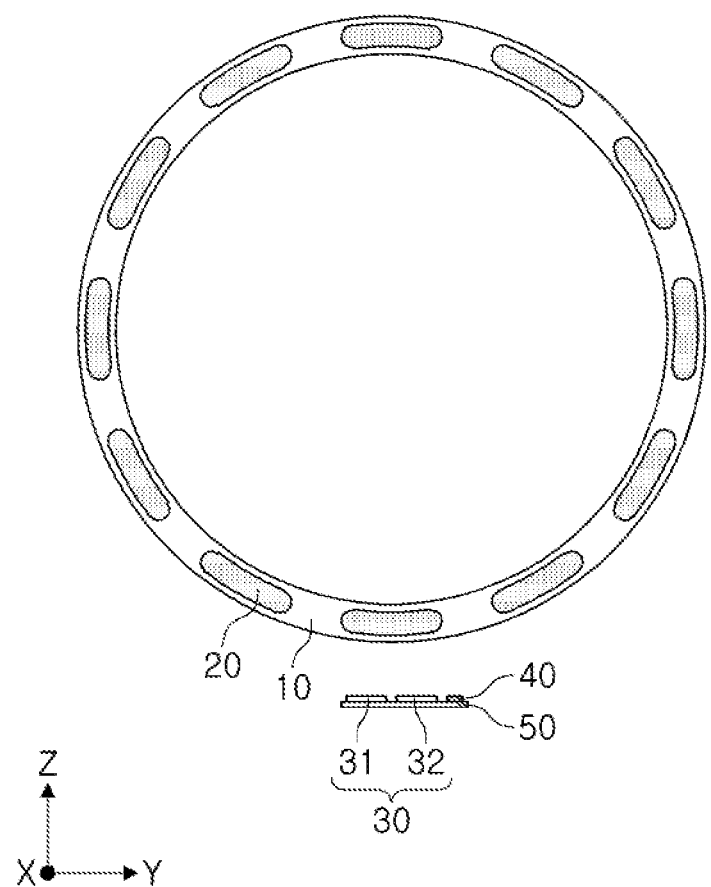
FIG. 1B is a view in an X-axis direction of the example illustrated in FIG. 1A.

FIG. 1A is a view illustrating an example of an apparatus for sensing a rotating body, and FIG. 1B is a view in an X-axis direction of the example illustrated in FIG. 1A.

The apparatus for sensing a rotating body includes a rotating body 10, units 20 to be detected, at least one coil unit 30, a rotation information calculator 40, and a substrate 50.

The rotating body 10 has a cylindrical shape, and rotates around a central axis of the cylindrical shape. The rotating body 10 is made of either one or both of a metal and a magnetic material.

The units 20 to be detected are disposed on the rotating body 10 having the cylindrical shape. The units 20 to be detected include a plurality of patterns. The plurality of patterns are made of either one or both of a metal and a magnetic material. When the units 20 to be detected and the rotating body 10 are made of the same material, the units 20 to be detected are attached to and protrude from a side surface of the rotating body 10. When the units 20 to be detected and the rotating body 10 are made of different materials, the units 20 to be detected are embedded in a side surface of the rotating body 10 in one example, or are attached to and protrude from a side surface of the rotating body 10 in another example. The units 20 to be detected are disposed at equal intervals on the side surface of the rotating body 10.

The coil unit 30 is formed as a circuit pattern on the substrate 50. In one example, the coil unit 30 is a winding type inductor coil, and in another example, the coil unit 30 is a solenoid coil.

The coil unit 30 includes two or more sensing coils 31 and 32. The two or more sensing coils 31 and 32 include a first sensing coil 31 and a second sensing coil 32. The first sensing coil 31 and the second sensing coil 32 face the side surface of the rotating body 10 having the cylindrical shape, and are disposed in a rotation direction of the rotating body 10. As the rotating body 10 rotates, overlapping areas between the units 20 to be detected and the first and second sensing coils 31 and 32 change, causing an inductance of each of the first and second sensing coils 31 and 32 to change. An example in which two sensing coils 31 and 32 are provided will hereinafter be described for convenience of explanation. However, in other examples, three or more sensing coils 31 and 32 may be provided.

The rotation information calculator 40 is implemented by an integrated circuit and is mounted on the substrate 50, and is electrically connected to the first sensing coil 31 and the second sensing coil 32. The rotation information calculator 40 calculates rotation information including any one or any combination of any two or more of a rotation direction, a rotation angle, and an angular velocity of the rotating body 10 based on a change in the inductance of each of the first sensing coil 31 and the second sensing coil 32 as the rotating body 10 rotates.

Figure 2A:
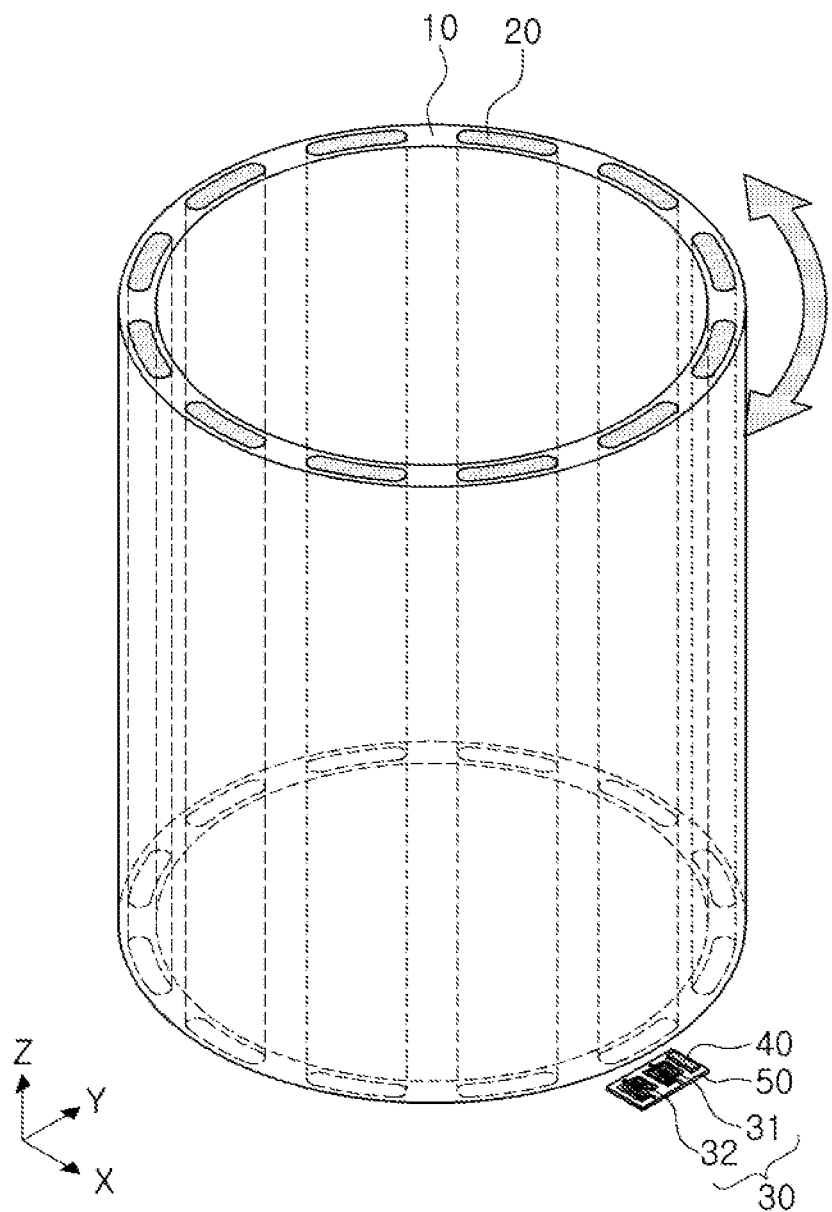
FIG. 2A is a view illustrating another example of an apparatus for sensing a rotating body.
Figure 2B:
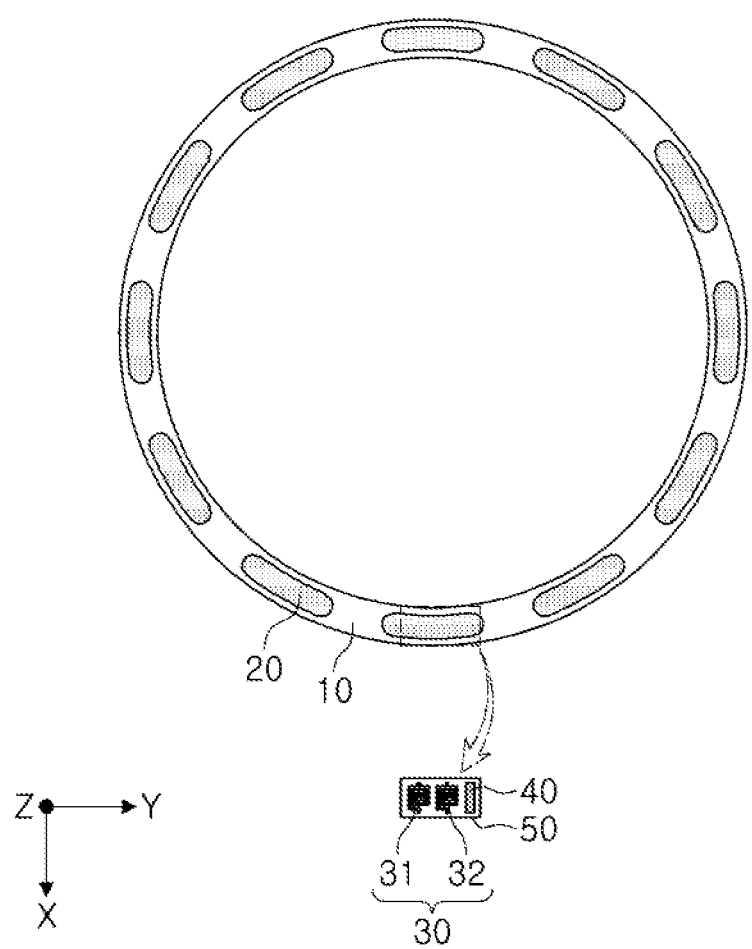
FIG. 2B is a view in a Z-axis direction of the example illustrated in FIG. 2A.

FIG. 2A is a view illustrating another example of an apparatus for sensing a rotating body, and FIG. 2B is a view taken in a Z-axis direction of the example illustrated in FIG. 2A.

Since the example of the apparatus for sensing a rotating body illustrated in FIG. 2A is similar to the example of the apparatus for sensing a rotating body illustrated in FIG. 1A, only differences between the two examples will be described.

Unlike the example illustrated in FIG. 1A, a first sensing coil 31 and a second sensing coil 32 illustrated in FIG. 2A face a bottom surface of a rotating body 10 having a cylindrical shape, and are disposed in a rotation direction of the rotating body 10. An inductance of each of the first sensing coil 31 and the second sensing coil 32 changes as overlapping areas between each of the first and second sensing coil 31 and 32 and units 20 to be detected change as the rotating body 10 rotates.

The units 20 to be detected disposed on the rotating body 10 having the cylindrical shape are made of either one or both of a metal and a magnetic material. When the units 20 to be detected and the rotating body 10 are made of the same material, the units 20 to be detected are attached to and protrude from a bottom surface of the rotating body 10. When the units 20 to be detected and the rotating body 10 are made of different materials, the units 20 to be detected are embedded in a bottom surface of the rotating body 10 in one example, or are attached to and protrude from a bottom surface of the rotating body 10 in another example. The units 20 to be detected are disposed at equal intervals on the bottom surface of the rotating body 10.

Figure 3:
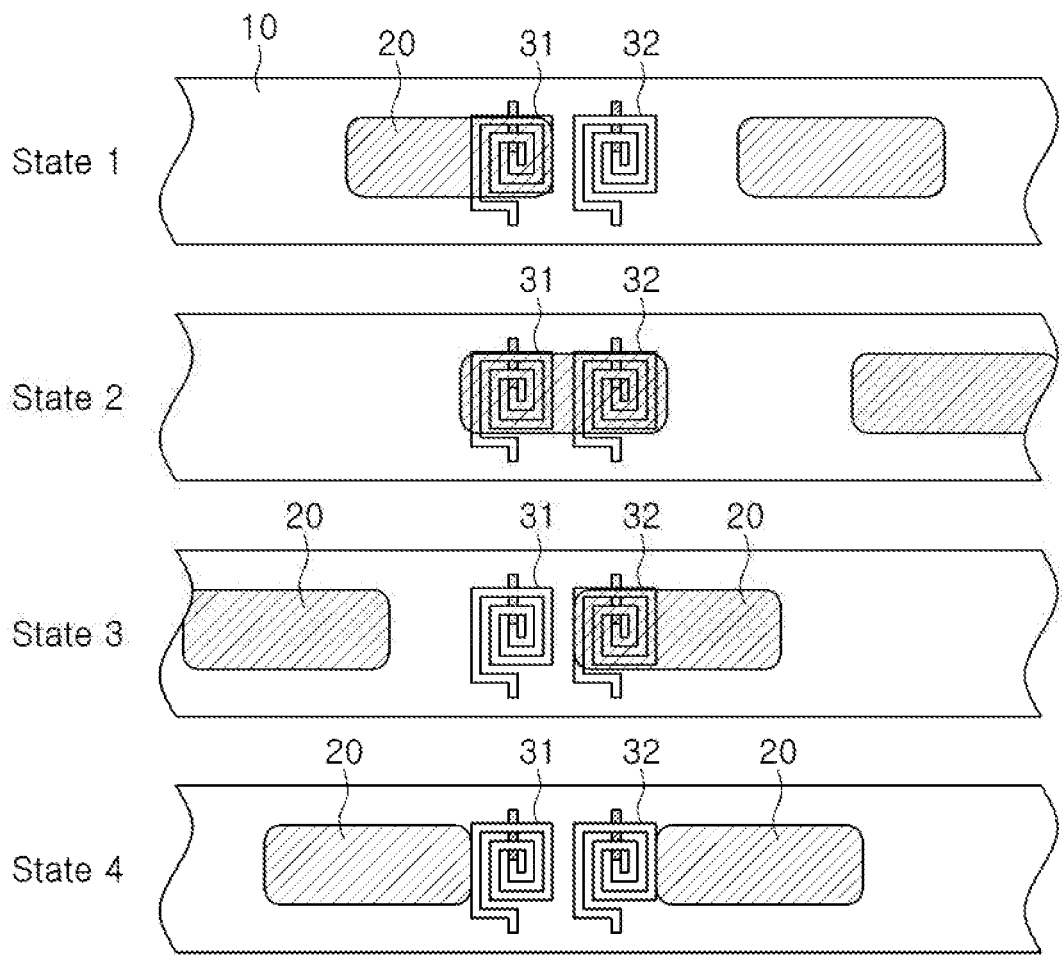
FIG. 3 illustrates examples of positional relationships between a unit to be detected and two sensing coils in the examples illustrated in FIGS. 1A and 2A.

FIG. 3 illustrates examples of positional relationships between a unit to be detected and two sensing coils in the examples illustrated in FIGS. 1A and 2A.

Referring to FIG. 3, overlapping areas between the units 20 to be detected and the first and second sensing coils 31 and 32 are changed by rotation of the rotating body 10. In FIG. 3, the rotating body 10 rotates in one direction, for example, a direction from left to right.

In detail, by the rotation of the rotating body 10, the first sensing coil 31 overlaps the unit 20 to be detected and the second sensing coil 32 does not overlap the unit 20 to be detected in a first state State 1. The first and second sensing coils 31 and 32 overlap the unit 20 to be detected in a second state State 2. The first sensing coil 31 does not overlap the unit 20 to be detected and the second sensing coil 32 overlaps the unit 20 to be detected in a third state State 3. The first and second sensing coils 31 and 32 do not overlap the unit 20 to be detected in a fourth state State 4.

A size of each of the units 20 to be detected and an interval between the units 20 to be detected are determined based on a size of each of the sensing coils and an interval between the centers of the sensing coils. In one example, the size of each of the units 20 to be detected and the interval between the units 20 to be detected is determined to be a product of the number of sensing coils and the size of each of the sensing coils. In detail, when X sensing coils are provided, and the size of each of the sensing coils and the interval between the centers of the sensing coils are equal to a target sensing angle for sensing the rotation of the rotating body, the size of each of the units 20 to be detected and the interval between the units 20 to be detected is equal to the target sensing angle×X. In general, the number of units to be detected provided on the rotating body rotating by 360 degrees is 360/(size of each of units to be detected+interval between units to be detected). Although FIGS. 1A, 1B, 2A, 2B, and 3 show that there is a space between the first and second sensing coils 31 and 32, when the interval between the centers of the first and second sensing coils 31 and 32 is equal to the size of each of the first and second sensing coils 31 and 32, there will be substantially no space between the first and second sensing coils 31 and 32.

The size of each of the sensing coils and the interval between the centers of the sensing coils are determined to be equal to a multiple of the target sensing angle for sensing the rotation of the rotating body.

In one example, the size of each of the sensing coils and the interval between the centers of the sensing coils is determined to be equal to the target sensing angle for sensing the rotation of the rotating body. When the target sensing angle of the rotating body 10 to be sensed is 3.75°, the size of each of the sensing coils is 3.75°, and the interval between the centers of the sensing coils is 3.75°. In this example, when two sensing coils are disposed, the size of each of the units to be detected and the interval between the units to be detected are 7.5° (=2×3.75°), and the number of units to be detected is 24 (=360/(7.5+7.5)).

In another example, the size of each of the sensing coils and the interval between the centers of the sensing coils are determined to be twice the target sensing angle for sensing the rotation of the rotating body. When the target sensing angle of the rotating body 10 to be sensed is 3.75°, the size of each of the sensing coils is 7.5°, and the interval between the centers of the sensing coils is 7.5°. In this example, when two sensing coils are disposed, the size of each of the units to be detected and the interval between the units to be detected are 15° (=2×7.5°), and the number of units to be detected is 12 (=360/(15+15)).

In another example, the size of each of the sensing coils and the interval between the centers of the sensing coils are determined to be twelve times the target sensing angle for sensing the rotation of the rotating body. When the target sensing angle of the rotating body 10 to be sensed is 3.75°, the size of each of the sensing coils is 45°, and the interval between the centers of the sensing coils is 45°. In this example, when two sensing coils are disposed, the size of each of the units to be detected and the interval between the units to be detected are 90° (=2×45°), and the number of units to be detected is 2 (=360/(90+90)).

Figure 4:
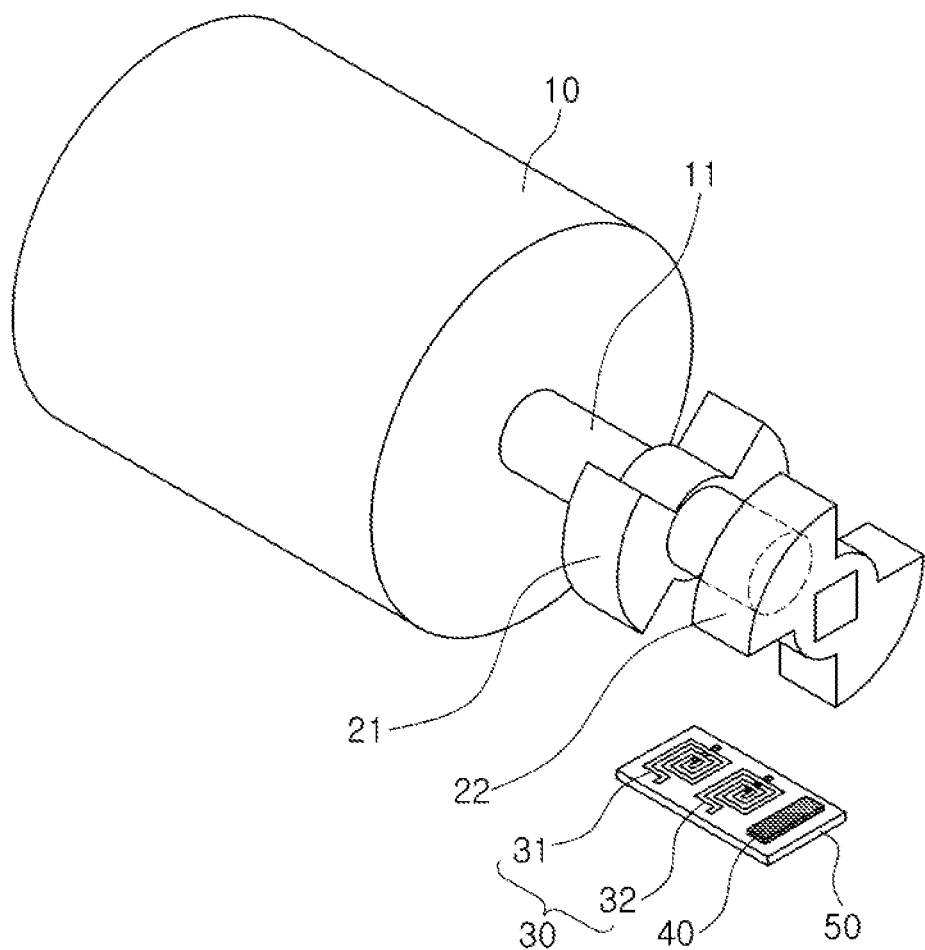
FIG. 4 is a view illustrating another example of an apparatus for sensing a rotating body.

FIG. 4 is a view illustrating another example of an apparatus for sensing a rotating body.

Since the example of the apparatus for sensing a rotating body illustrated in FIG. 4 is similar to the example of the apparatus for sensing a rotating body illustrated in FIG. 1A, only differences between the two examples will be described.

Referring to FIG. 4, a rotating body 10 having a cylindrical shape is connected to two or more units 21 and 22 to be detected through a shaft 11. The two or more units 21 to 22 to be detected include a first unit 21 to be detected and a second unit 22 to be detected. The first unit 21 to be detected and the second unit 22 to be detected are connected to one shaft 11 at different rotational orientations and rotate in the same direction and at the same speed. A coil unit 30 includes a first sensing coil 31 and a second sensing coil 32. The first sensing coil 31 is disposed to face the first unit 21 to be detected, and the second sensing coil 32 is disposed to face the second unit 22 to be detected.

Each of the first unit 21 to be detected and the second unit 22 to be detected includes a plurality of patterns having the same size and the same interval. In FIG. 4, protruding portions of the first unit 21 to be detected and the second unit 22 to be detected correspond to the patterns. The plurality of patterns of the first unit 21 to be detected and the plurality of patterns of the second unit 22 to be detected have different phases. Regions of the plurality of patterns of the first unit 21 to be detected and regions of the plurality of patterns of the second unit 22 to be detected overlap each other in an axial direction of the shaft 11. Sizes of the overlapping regions correspond to sizes of the first sensing coil 31 and the second sensing coil 32.

In one example, a size of one of the plurality of patterns of the first unit 21 to be detected is twice the size of the first sensing coil 31, and a size of one of the plurality of patterns of the second unit 22 to be detected is twice the size of the second sensing coil 32. The size of each of the first sensing coil 31 and the second sensing coil 32 is equal to a target sensing angle for sensing the rotation of the rotating body 10.

Since regions of the plurality of patterns of the first unit 21 to be detected and regions of the plurality of patterns of the second unit 22 to be detected overlap each other in the axial direction of the shaft 11 in the example illustrated in FIG. 4, a diameter of the rotating body 10 is reduced compared to the examples illustrated in FIG. 1A.

Figure 5:
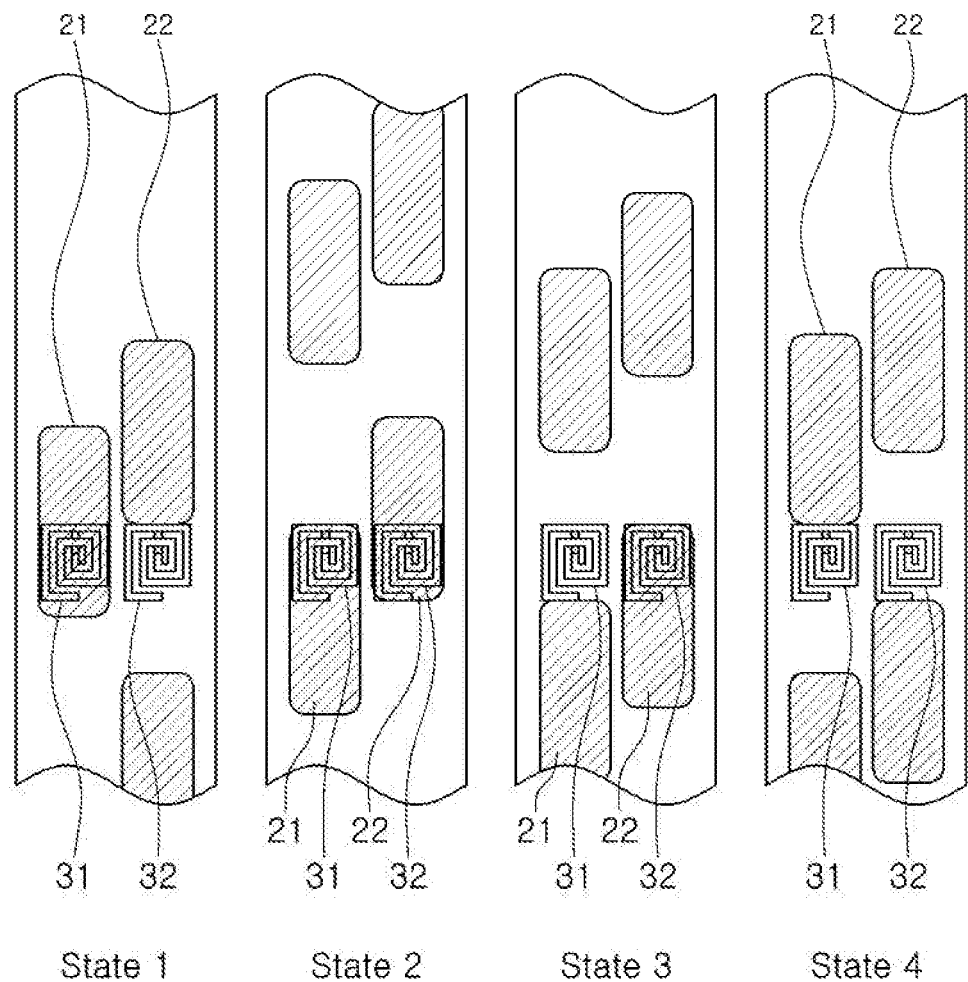
FIG. 5 illustrates examples of positional relationships between a unit to be detected and two sensing coils in the example illustrated in FIG. 4.

FIG. 5 illustrates examples of positional relationships between a unit to be detected and two sensing coils in the example illustrated in FIG. 4.

Referring to FIG. 5, overlapping areas between the units 20 to be detected and the first and second sensing coils 31 and 32 are changed by rotation of the rotating body 10. In FIG. 5, the rotating body 10 rotates in one direction, for example, a direction from top to bottom.

In detail, by the rotation of the rotating body 10, the first sensing coil 31 overlaps the unit 20 to be detected and the second sensing coil 32 does not overlap the unit 20 to be detected in a first state State 1. The first and second sensing coils 31 and 32 overlap the unit 20 to be detected in a second state State 2. The first sensing coil 31 does not overlap the unit 20 to be detected and the second sensing coil 32 overlaps the unit 20 to be detected in a third state State 3. The first and second sensing coils 31 and 32 do not overlap the unit 20 to be detected in a fourth state State 4.

Figure 6:
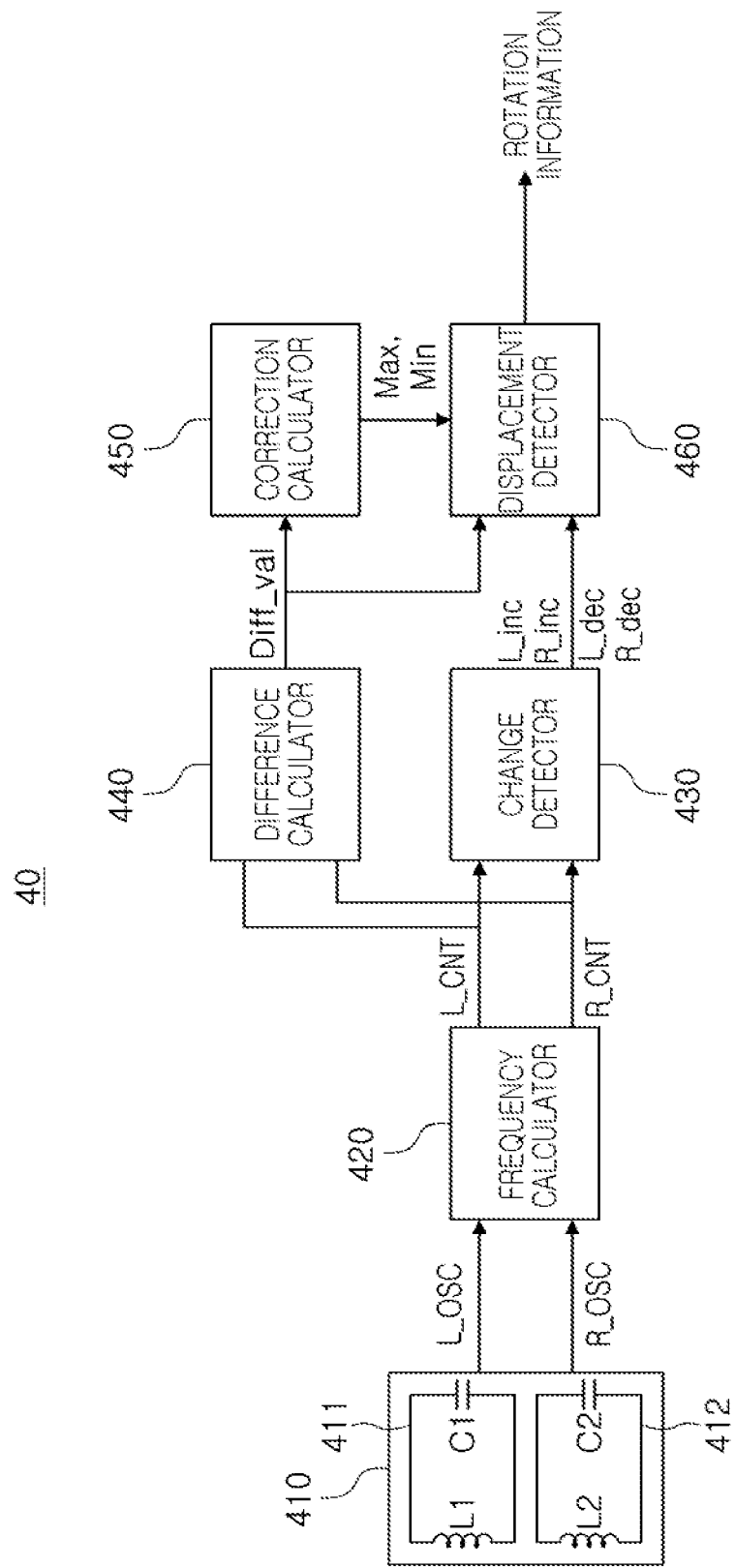
FIG. 6 is a block diagram illustrating an example of a rotation information calculator.
Figure 7:
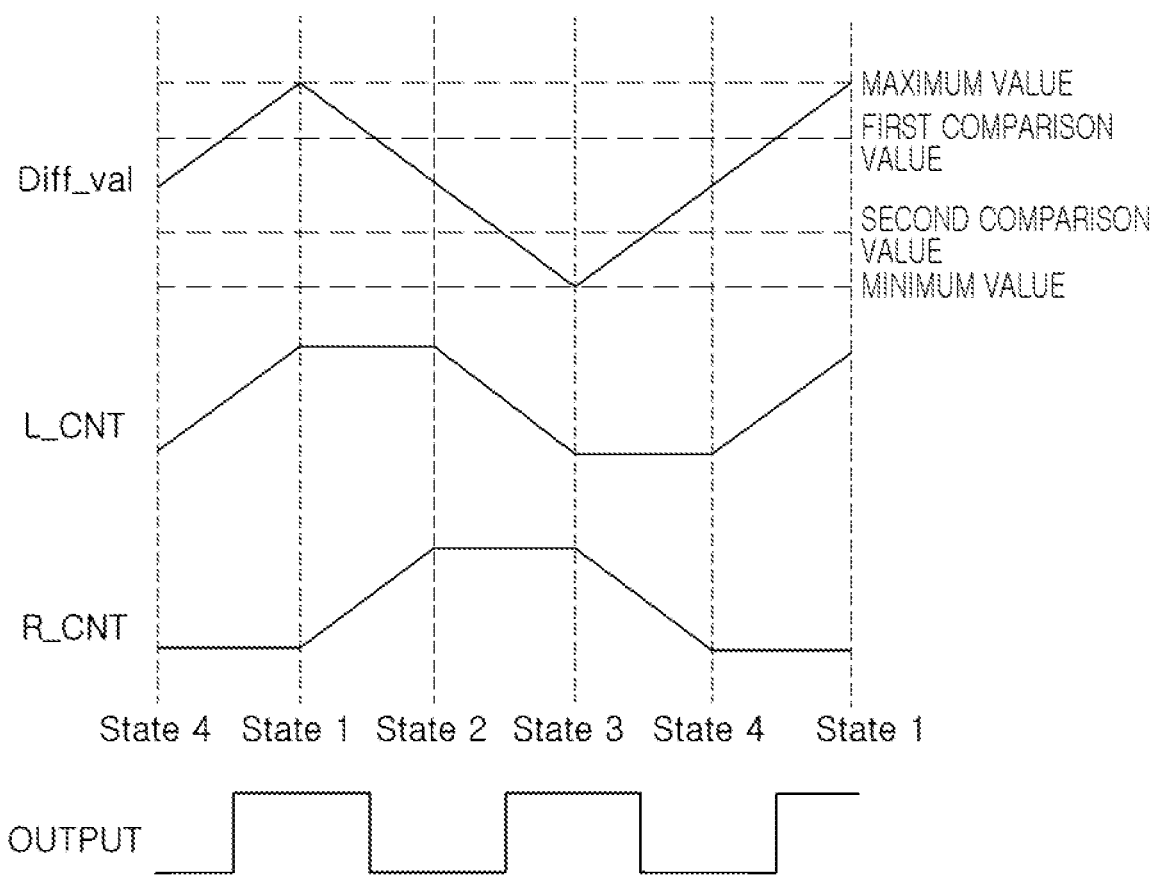
FIG. 7 illustrates an example of main signals of a rotation information calculator.

FIG. 6 is a block diagram illustrating an example of a rotation information calculator, and FIG. 7 illustrates an example of waveforms of main signals of a rotation information calculator.

A method for sensing a rotating body performed by an apparatus for sensing a rotating body will be described in detail with reference to FIGS. 6 and 7.

A rotation information calculator 40 includes an oscillator 410, a frequency calculator 420, a change detector 430, a difference calculator 440, a correction calculator 450, and a displacement detector 460. The frequency calculator 420, the change detector 430, the difference calculator 440, the correction calculator 450, and the displacement detector 460 are implemented in hardware, for example, by an application-specific integrated circuit (ASIC) or one or more processors.

The oscillator 410 includes two or more oscillation circuits 411 and 412. The two or more oscillation circuits 411 and 412 include a first oscillation circuit 411 and a second oscillation circuit 412. The first oscillation circuit 411 includes a first sensing coil L1 and a first capacitor C1, and the second oscillation circuit 412 includes a second sensing coil L2 and a second capacitor C2. In FIG. 6, the first sensing coil L1 and the second sensing coil L2 correspond to the first and second sensing coils 31 and 32 illustrated in FIGS. 1A, 2A, and 4. A pair of a sensing coil and a capacitor form an LC tank circuit of an oscillator. The first oscillation circuit 411 and the second oscillation circuit 412 may be implemented as any of various well-known types of oscillators.

When overlapping areas between the units 20 to be detected and the first and second sensing coils L1 or 31 and L2 or 32 are changed by the rotation of the rotating body 10, frequencies of oscillation signals output from the first oscillation circuit 411 and the second oscillation circuit 412 are changed.

The frequency calculator 420 receives a first oscillation signal L_OSC and a second oscillation signal R_OSC respectively output from the first oscillation circuit 411 and the second oscillation circuit 412. The frequency calculator 420 linearizes changes in frequencies of the first oscillation signal L_OSC and the second oscillation signal R_OSC to generate a first count value L_CNT and a second count value R_CNT. In one example, the frequency calculator 420 counts the frequencies of the first oscillation signal L_OSC and the second oscillation signal R_OSC to generate the first count value L_CNT and the second count value R_CNT.

The change detector 430 detects changes in the first count value L_CNT and the second count value R_CNT. In one example, the change detector 430 detects the changes in the first count value L_CNT and the second count value R_CNT at a reference time interval Δt to generate a first count increase value L_inc, a first count decrease value L_dec, a second count increase value R_inc, and a second count decrease value R_dec.

In one example, the change detector 430 determines that the first count increase value L_inc is 1 when the first count value L_CNT increases, determines that the first count decrease value L_dec is 1 when the first count value L_CNT decreases, determines that the second count increase value R_inc is 1 when the second count value R_CNT increases, and determines that the second count decrease value R_dec is 1 when the second count value R_CNT decreases. In other cases, the change detector 430 determines that the first count increase value L_inc, the first count decrease value L_dec, the second count increase value R_inc, and the second count decrease value R_dec are 0.

The difference calculator 440 calculates a difference between the first count value L_CNT and the second count value R_CNT to generate a difference value Diff_val. The correction calculator 450 stores a maximum value Max and a minimum value Min of the difference value Diff_val therein and outputs the maximum value Max and a minimum value Min.

The displacement detector 460 calculates an angular velocity, a direction, and a rotation angle of the rotating body based on the four signals of the first count increase value L_inc, the first count decrease value L_dec, the second count increase value R_inc, and the second count decrease value R_dec generated by the change detector 430, the difference value Diff_val generated by the difference calculator 440, and the maximum value Max and the minimum value Min output from the correction calculator 450.

When the overlapping areas between the units 20 to be detected and the first and second sensing coils 31 and 32 are changed as illustrated in FIGS. 3 and 5, first count values L_CNT, second count values R_CNT, and difference values Diff_val in the first state State 1 to the fourth state State 4 are calculated as illustrated in FIG. 7.

The displacement detector 460 compares the difference value Diff_val with a first comparison value and a second comparison value to generate an output signal OUTPUT. The first comparison value is greater than the second comparison value, and the first comparison value and the second comparison value are between the minimum value and the maximum value.

The first comparison value and the second comparison value are determined so that a difference between the first comparison value and the second comparison value is equal to twice the difference between the maximum value and the first comparison value or twice the difference between the second comparison value and the minimum value.

In one example, the first comparison value is equal to (maximum value (Max)×3+minimum value (Min))/4, and the second comparison value is equal to (maximum value (Max)+minimum value (Min)×3)/4.

The displacement detector 460 generates the output signal OUTPUT to have a high level when the difference value Diff_val is equal to or greater than the first comparison value, generates the output signal OUTPUT to have a high level when the difference value Diff_val is less than the second comparison value, and generates the output signal OUTPUT to have a low level when the difference value Diff_val is less than the first comparison value and equal to or greater than the second comparison value.

The displacement detector 460 calculates a rotation angle of the rotating body. In one example, the displacement detector 460 calculates a rotation angle of the rotating body based on high level periods and low level periods of the output signal OUTPUT. In one example, the displacement detector 460 calculates the rotation angle of the rotating body by counting the high level periods and low level periods of the output signal OUTPUT to obtain a count value, and multiplying the count value by the sensing angle. For example, if the count value of the high level periods and low level periods is 10 and the sensing angle is 3.75°, the rotation angle of the rotating body is 37.5° (=10×3.75°). In another example, the displacement detector 460 calculates the rotation angle by counting the cycles of the output signal OUTPUT (each cycle consisting of one high level period and one low level period) to obtain a count value, multiplying the count value by the sensing angle, and multiplying the result by 2. For example, if the count value of the cycles is 5 and the sensing angle is 3.75°, the rotation angle of the rotating body is 37.5° (=5×3.75°×2).

The displacement detector 460 also calculates an angular velocity of the rotating body. In one example, the displacement detector 460 measures a frequency freq of the output signal OUTPUT and calculates an angular velocity of the rotating body based on the measured frequency freq. In one example, when a radius r of the rotating body is 1 in an equation (r×Δθ)/Δt) of the angular velocity, the angular velocity is equal to Δθ/Δt. In one example, one cycle of the output signal OUTPUT (consisting of one high level period and one low level period) corresponds to the rotating body rotating through a rotation angle Δθ equal to twice the sensing angle. When the sensing angle is 3.75°, the rotation angle Δθ of the rotating body corresponding to one cycle of the output signal OUTPUT is 7.5° (=2×3.75°). The frequency freq of the output signal OUTPUT is the number of cycles of the output signal OUTPUT per second, so the angular velocity is 7.5°×freq per second.

In another example, the displacement detector 460 calculates the angular velocity based on the difference value Diff_val and the maximum value Max and the minimum value Min of the difference value Diff_val. When r is 1 and Δt is 1 in the equation (r×Δθ)/Δt) of the angular velocity, the angular velocity is equal to Δθ. When the size of each of the sensing coils and the interval between the centers of the sensing coils is 3.75° as in the example illustrated in FIG. 3, the difference value Diff_val illustrated in FIG. 7 changes from the maximum value (MAX) to the minimum value (MIN) (or from the minimum value (MIN) to the maximum value (MAX)) as the rotating body rotates by 7.5° (=2×3.75°). Thus, a change amount k in the difference value Diff_val for 1° is (maximum value (Max)−minimum value (Min))/7.5°. The unit of Diff_val is counts, because Diff_val is the difference between the first count value L_CNT and the second count value R_CNT. Thus, the units of k is counts/degree. If a change amount ΔDiff in the difference value Diff_val for Δt=1 is known, the angular velocity Δθ can be calculated by calculating ΔDiff/k. Since the unit of Diff_val is counts, the unit of ΔDiff for Δt=1 is counts/time unit, where "time unit" may be seconds, minutes, etc. If the time unit is seconds, then the unit of ΔDiff for Δt=1 second is counts/second. If ΔDiff for Δt=1 second is known, the angular velocity Δθ is equal to (ΔDiff counts/second)/(k counts/degree) or ΔDiff/k degrees/second. ΔDiff for Δt=1 second may be determined by calculating (Diff_val(n)−Diff_val(n−1))/(t(n)−t(n−1)), where Diff_val(n) is the difference value Diff_val at a current sampling time t(n), and Diff_val(n) is the difference value Diff_val at a previous sampling time t(n−1). For example, if Diff_val(n)=20 counts, Diff_val(n−1)=10 counts, t(n)=0.85 seconds, and t(n−1)=0.80 seconds, ΔDiff for Δt=1 second is equal to (20−10)/(0.85−0.80), or 10/0.05, or 200 counts/second. If (maximum value (Max)−minimum value (Min)) is 150 counts for the example of 7.5° referred to above, then k is 150 counts/7.5°, or 20 counts/degree. Then the angular velocity Δθ=ΔDiff/k is (200 counts/second)/(20 counts/degree) or 10 degrees/second.

The displacement detector 460 calculates the rotation direction of the rotating body based on the first count increase value L_inc, the first count decrease value L_dec, the second count increase value R_inc, and the second count decrease value R_dec detected at a point in time at which the difference value Diff_val is compared with the first comparison value and the second comparison value and a dispositional relationship between at least two sensing coils.

In one example, since the first sensing coil 31 is disposed on the left and the second sensing coil 32 is disposed on the right in FIG. 3, when signals of the first count increase value L_inc, the second count increase value R_inc, the first count decrease value L_dec, and the second count decrease value R_dec are sequentially 1000 at one point in time and 0100 at the next point in time, the rotation direction of the units to be detected is a direction from left to right in FIG. 3. A state of 0000 corresponds to a stop state of the rotating body and is ignored.

As a result, when the units to be detected rotate and move from left to right in FIG. 3, the signals of the first count increase value L_inc, the second count increase value R_inc, the first count decrease value L_dec, and the second count decrease value R_dec change in the sequence 1000→0100→0010→0001→1000, and when the units to be detected rotate and move from right to left in FIG. 3, the signals of the first count increase value L_inc, the second count increase value R_inc, the first count decrease value L_dec, and the second count decrease value R_dec change in the sequence 1000→0001→0010→0100→1000.

Figure 8:
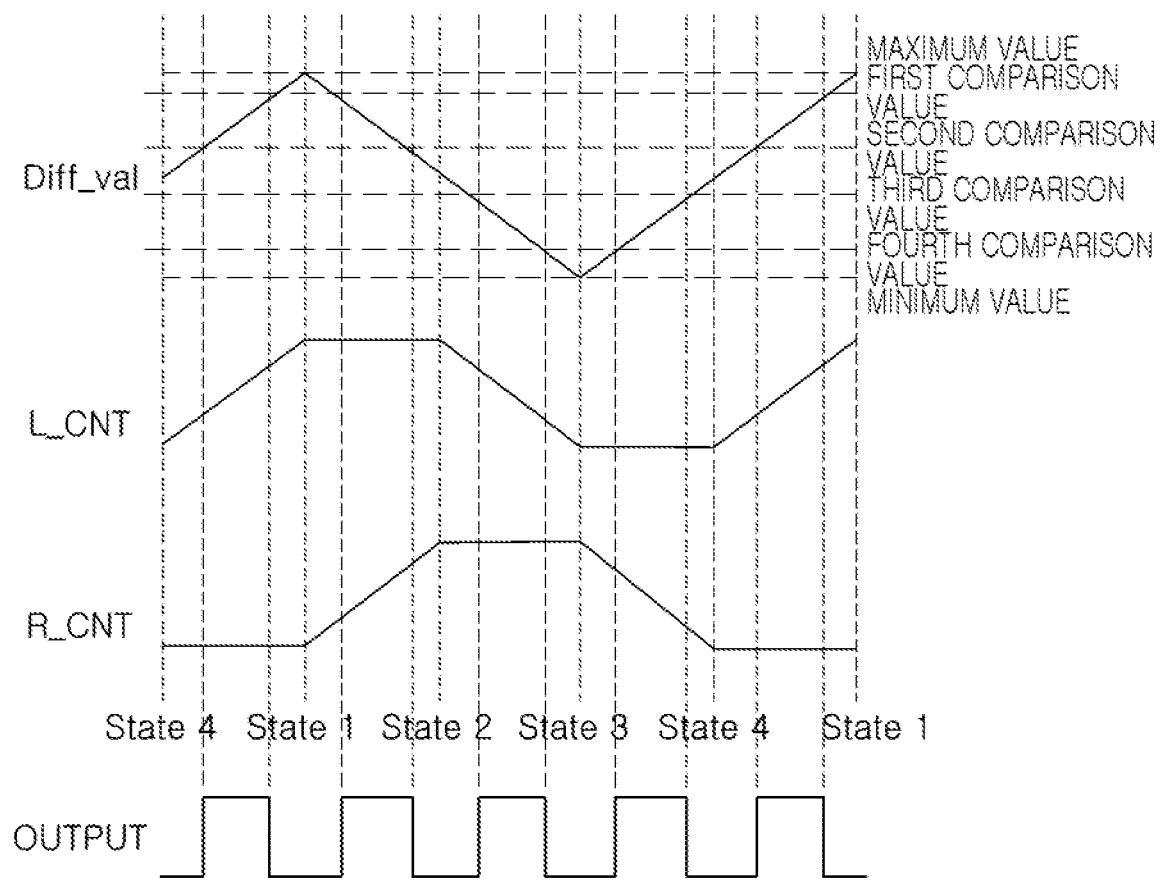
FIG. 8 illustrates another example of main signals of a rotation information calculator.

FIG. 8 illustrates another example of waveforms of main signals of a rotation information calculator.

Since the waveforms of the main signals in the example illustrated in FIG. 8 are similar to the waveforms of the main signals in the example illustrated in FIG. 7, only differences between the two examples will be described.

When the overlapping areas between the units 20 to be detected and the first and second sensing coils 31 and 32 as illustrated in FIGS. 3 and 5 are changed, first count values L_CNT, second count values R_CNT, and difference values Diff_val in the first state State 1 to the fourth state State 4 are calculated as illustrated in FIG. 8.

The displacement detector 460 compares the difference value Diff_val with a first comparison value to a fourth comparison value to generate an output signal OUTPUT. The first comparison value is greater than the second comparison value, the second comparison value is greater than the third comparison value, and the third comparison is greater than the fourth comparison value, and the first comparison value to the fourth comparison value are between the minimum value and the maximum value.

The first comparison value to the fourth comparison value are determined so that a difference between the first comparison value and the second comparison value, a difference between the second comparison value and the third comparison value, and a difference between the third comparison value and the fourth comparison value are equal to each other, and the difference between the first comparison value and the second comparison value, the difference between the second comparison value and the third comparison value, and the difference between the third comparison value and the fourth comparison value are equal to twice the difference between the maximum value and the first comparison value or twice the difference between the fourth comparison value and the minimum value.

In one example, the first comparison value is equal to (minimum value (Min)+range difference value (Range)×⅛), the second comparison value is equal to (minimum value (Min)+range difference value (Range)×⅜), the third comparison value is equal to (minimum value (Min)+range difference value (Range)×⅝), and the fourth comparison value is equal to (minimum value (Min)+range difference value (Range)×⅞). The range difference value Range is equal to a difference between the maximum value Max and the minimum value Min.

The displacement detector 460 generates the output signal OUTPUT to have a low level when the difference value Diff_val is equal to or greater than the first comparison value, generates the output signal OUTPUT to have a high level when the difference value Diff_val is less than the first comparison value and equal to or greater than the second comparison value, generates the output signal OUTPUT to have a low level when the difference value Diff_val is less than the second comparison value and equal to or greater than the third comparison, generates the output signal OUTPUT to have a high level when the difference value Diff_val is less than the third comparison value and equal to or greater than the fourth comparison value, generates the output signal OUTPUT to have a low level when the difference value Diff_val is less than the fourth comparison value, The displacement detector 460 measures a change in an angle of the units to be detected from high level periods and low level periods of the output signal OUTPUT.

In addition, the displacement detector 460 measures a frequency of the output signal OUTPUT to calculate an angular velocity.

In addition, the displacement detector 460 calculates the rotation direction of the rotating body based on the first count increase value L_inc, the first count decrease value L_dec, the second count increase value R_inc, the second count decrease value R_dec, and high levels and low levels of the first count value L_CNT and the second count value R_CNT at a point in time in which the difference value Diff_val is compared with the first to fourth comparison values. The first count value L_CNT has a high level when the first count value is equal to or greater than a median value ((maximum value+minimum value)/2) of the first count value L_CNT, and has a low level when the first count value is less than the median value ((maximum value+minimum value)/2) of the first count value L_CNT. Likewise, the second count value R_CNT has a high level when the second count value is equal to or greater than a median value ((maximum value+minimum value)/2) of the second count value R_CNT, and has a low level when the second count value is less than the median value ((maximum value+minimum value)/2) of the second count value R_CNT. When signals of the first count increase value L_inc, the second count increase value R_inc, the first count decrease value L_dec, and the second count decrease value R_dec are sequentially 1000 and the second count value R_CNT is the low level at one point in time, the rotation direction of the units to be detected is a direction from left to right in FIG. 3 or a direction from top to bottom in FIG. 5. When signals of the first count increase value L_inc, the second count increase value R_inc, the first count decrease value L_dec, and the second count decrease value R_dec are sequentially 1000 and the second count value R_CNT is the high level at another point in time, the rotation direction of the units to be detected is a direction from right to left of FIG. 3 or a direction from bottom to top in FIG. 5.

When the first count increase value L_inc, the second count increase value R_inc, the first count decrease value L_dec, and the second count decrease values R_dec are the same at a current point in time as they were at a previous point in time, it may be determined that the rotation direction at the current point in time is the same as the rotation direction determined at the previous point in time.

Also, when the first count increase value L_inc, the second count increase value R_inc, the first count decrease value L_dec, and the second count decrease value R_dec at a current point in time are different from what they were at a previous point in time, for example, when {L_inc, R_inc, L_dec, R_dec} at the current point in time correspond to {L_dec, R_dec, L_inc, R_inc} at the previous point in time, it is determined that the rotation direction at the current point in time is the opposite of the rotation direction determined at the previous point in time.

In one example, when sensing coils and units to be detected having the same configuration are used in both the example illustrated in FIG. 7 and the example illustrated in FIG. 8, the example illustrated in FIG. 8 provides an increased angular resolution, that is, a smaller sensing angle, compared to the example illustrated in FIG. 7 because the number of comparison values in the example illustrated in FIG. 8 is greater than the number of comparison values in the example illustrated in FIG. 7. In another example, when the size of sensing coils and the size of units to be detected used in the example illustrated in FIG. 8 are larger than the size of sensing coils and the size of units to be detected used in the example illustrated in FIG. 7, the example illustrated in FIG. 8 can provide a same angular resolution, that is, a same sensing angle, as the example illustrated in FIG. 7 because the number of comparison values in the example illustrated in FIG. 8 is greater than the number of comparison values in the example illustrated in FIG. 7.

Figure 9:
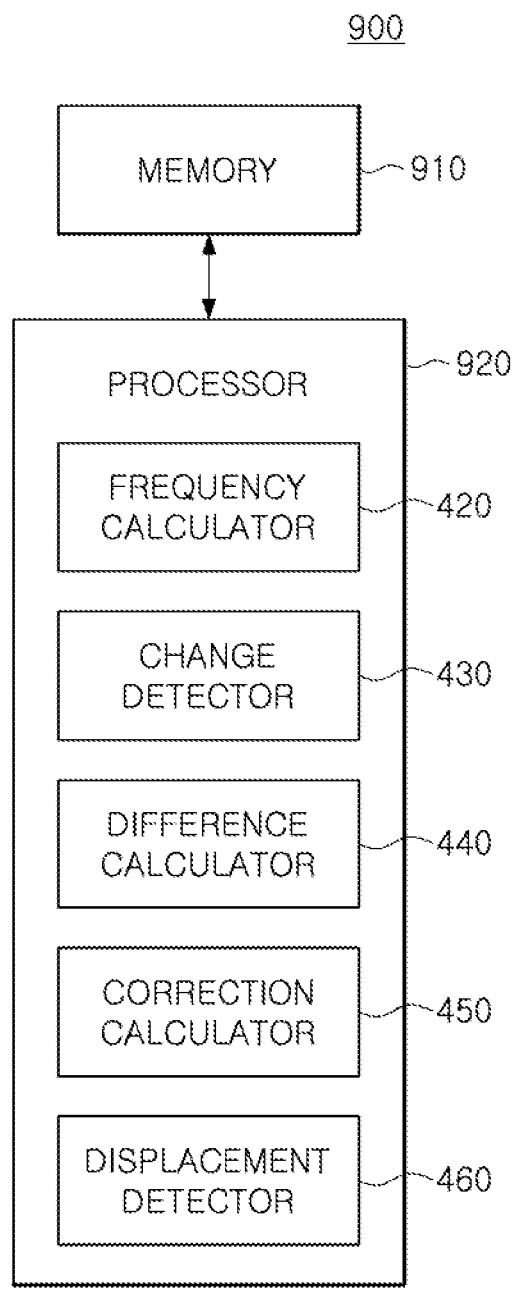
FIG. 9 is a block diagram illustrating another example of a rotation information calculator.

FIG. 9 is a block diagram illustrating another example of a rotation information calculator.

A rotation information calculator 900 includes a memory 910 and a processor 920. The memory 910 stores instructions that, when executed by the processor 920, cause the processor 920 to perform the functions of the frequency calculator 420, the change detector 430, the difference calculator 440, the correction calculator 450, and the displacement detector 460 in FIG. 6. Thus, the processor 920 includes the frequency calculator 420, the change detector 430, the difference calculator 440, the correction calculator 450, and the displacement detector 460.

The rotation information calculator 900 is connected to the oscillator 410 in FIG. 6 to enable the rotation information calculator 900 to calculate rotation information from the first oscillation signal L_OSC and the second oscillation signal R_OSC output from the oscillator 410.

In the example described above, a fine displacement of the rotating body may be precisely sensed from a change in a frequency of an oscillation signal.

The rotation information calculator 40, the oscillator 410, the first oscillator circuit 411, the second oscillation circuit 412, the frequency calculator 420, the change detector 430, the difference calculator 440, the correction calculator 450, and the displacement detector 460 in FIG. 6 and the rotation information calculator 900, the memory 910, the processor 920, the frequency calculator 420, the change detector 430, the difference calculator 440, the correction calculator 450, and the displacement detector 460 in FIG. 9 perform the operations described in this application are implemented by hardware components configured to perform the operations described in this application that are performed by the hardware components. Examples of hardware components that may be used to perform the operations described in this application where appropriate include sensing coils, capacitors, controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components as described above may be written as computer programs, code segments, instructions or any combination thereof, for individually or collectively instructing or configuring the one or more processors or computers to operate as a machine or special-purpose computer to perform the operations that are performed by the hardware components as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components as described above.

The instructions or software to control computing hardware, for example, one or more processors or computers, to implement the hardware components as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing a rotating body, the apparatus comprising:
   a plurality of units to be detected provided on the rotating body;
   at least two sensing coils facing the units to be detected;
   an oscillator comprising at least two capacitors respectively connected to the at least two sensing coils to form at least two oscillation circuits; and
   a rotation information calculator configured to:
     count frequencies of at least two oscillation signals respectively output from the at least two oscillation circuits to generate a first count value and a second count value, and
     calculate a rotation direction of the rotating body based on a change in the first count value and a change in the second count value.

2. The apparatus of claim 1, wherein the rotation information calculator is further configured to:
   generate a first count increase value in response to an increase in the first count value,
   generate a first count decrease value in response to a decrease in the first count value,
   generate a second count increase value in response to an increase in the second count value, and
   generate a second count decrease value in response to a decrease in the second count value.

3. The apparatus of claim 2, wherein the rotation information calculator is further configured to calculate the rotation direction of the rotating body based on the first count increase value, the first count decrease value, the second count increase value, the second count decrease value, and a dispositional relationship between the at least two sensing coils.

4. The apparatus of claim 1, wherein the rotation information calculator is further configured to calculate either one or both of a rotation angle of the rotating body and an angular velocity of the rotating body based on an output signal generated by comparing a difference value between the first count value and the second count value with a plurality of comparison values.

5. The apparatus of claim 4, wherein the plurality of comparison values are between a maximum value and a minimum value of the difference value.

6. The apparatus of claim 5, wherein a difference between two adjacent comparison values of the plurality of comparison values is equal to twice a difference between a comparison value, adjacent to the maximum value, among the plurality of comparison values and the maximum value, or twice a difference between a comparison value, adjacent to the minimum value, among the plurality of comparison values and the minimum value.

7. The apparatus of claim 4, wherein the rotation information calculator is further configured to calculate the rotation angle of the rotating body from high level periods and low level periods of the output signal.

8. The apparatus of claim 4, wherein the rotation information calculator is further configured to calculate the angular velocity of the rotating body based on a frequency of the output signal.

9. The apparatus of claim 1, wherein the rotation information calculator is further configured to calculate an angular velocity of the rotating body based on a maximum value and a minimum value of a difference value between the first count value and the second count value.

10. The apparatus of claim 1, wherein a size of each of the at least two sensing coils and an interval between centers of the at least two sensing coils is equal to a multiple of a target sensing angle for sensing rotation of the rotating body.

11. The apparatus of claim 1, wherein a size of each of the plurality of units to be detected and an interval between the plurality of units to be detected is equal to a product of a number of the at least two sensing coils and a size of each of the at least two sensing coils.

12. An apparatus for sensing a rotating body, the apparatus comprising:
a first unit to be detected connected to the rotating body and comprising a plurality of patterns having a first phase;
a second unit to be detected connected to the rotating body and comprising a plurality of patterns having a second phase different from the first phase;
a first sensing coil facing the first unit to be detected;
a second sensing coil facing the second unit to be detected;
an oscillator comprising:
a first capacitor connected to the first sensing coil to form a first oscillation circuit; and
a second capacitor connected to the second sensing coil to form a second oscillation circuit; and
a rotation information calculator configured to:
count a frequency of a first oscillation signal output from the first oscillation circuit to generate a first count value,
count a frequency of a second oscillation signal output from the second oscillation circuit to generate a second count value, and
calculate a rotation direction of the rotating body based on a change in the first count value and a change in the second count value.

13. The apparatus of claim 12, wherein regions of the plurality of patterns of the first unit to be detected and regions of the plurality of patterns of the second unit to be detected partially overlap each other in an axial direction of the rotating body.

14. The apparatus of claim 13, wherein sizes of the regions are equal to sizes of the first sensing coil and the second sensing coil.

15. The apparatus of claim 14, wherein the sizes of the first sensing coil and the second sensing coil are equal to a target sensing angle for sensing rotation of the rotating body.

16. The apparatus of claim 14, wherein a size of one of the plurality of patterns of the first unit to be detected is equal to twice the size of the first sensing coil, and
a size of one of the plurality of patterns of the second unit to be detected is equal to twice the size of the second sensing coil.

17. An apparatus for sensing a rotating body, the apparatus comprising:
a plurality of units to be detected provided on the rotating body;
at least two oscillation circuits coupled to the units to be detected and configured to respectively output at least two oscillation signals having respective frequencies that change as the rotating body rotates; and
a processor configured to:
count the frequencies of at the least two oscillation signals to generate a first count value and a second count value, and
calculate a rotation direction of the rotating body based on a change in the first count value and a change in the second count value.

18. The apparatus of claim 17, further comprising a memory configured to store instructions executable by the processor,
wherein the processor is further configured to execute the instructions to configure the processor to:
count the frequencies of at the least two oscillation signals to generate the first count value and the second count value, and
calculate the rotation direction of the rotating body based on the change in the first count value and the change in the second count value.

19. The apparatus of claim 17, wherein each of the at least two oscillation circuits is sequentially coupled to each of the units to be detected as the rotating body rotates.

20. The apparatus of claim 17, wherein the processor is further configured to:
calculate a difference value equal to a difference between the first count value and a second count value,
compare the difference value with a plurality of comparison values,
generate an output signal having high level periods alternating with low level periods based on a result of the comparing, and
calculate either one or both of a rotation angle of the rotating body and an angular velocity of the rotating body based on the output signal.

21. An apparatus for sensing a rotating body, the apparatus comprising:

a first unit to be detected connected to the rotating body and comprising a plurality of patterns having a first phase;

a second unit to be detected connected to the rotating body and comprising a plurality of patterns having a second phase different from the first phase;

two oscillation circuits coupled to the units to be detected and configured to respectively output two oscillation signals having respective frequencies that change as the rotating body rotates; and a processor configured to:
    count the frequencies of the two oscillation signals to generate a first count value and a second count value, and
    calculate a rotation direction of the rotating body based on a change in the first count value and a change in the second count value.

22. The apparatus of claim 21, further comprising a memory configured to store instructions executable by the processor, wherein the processor is further configured to execute the instructions to configure the processor to:
    count the frequencies of the two oscillation signals to generate the first count value and the second count value, and
    calculate the rotation direction of the rotating body based on the change in the first count value and the change in the second count value.

23. The apparatus of claim 21, wherein the two oscillation circuits comprise:

a first oscillation circuit sequentially coupled to each of patterns of the first unit to be detected as the rotating body rotates and not coupled to any of the patterns of the second unit to be detected; and a second oscillation circuit sequentially coupled to each of patterns of the second unit to be detected as the rotating body rotates and not coupled to any of the patterns of the first unit to be detected.

24. The apparatus of claim 21, wherein the processor is further configured to:

calculate a difference value equal to a difference between the first count value and a second count value, compare the difference value with a plurality of comparison values, generate an output signal having high level periods alternating with low level periods based on a result of the comparing, and calculate either one or both of a rotation angle of the rotating body and an angular velocity of the rotating body based on the output signal.

\* \* \* \* \*